United States Patent [19]

Beall et al.

[11] 3,936,287

[45] Feb. 3, 1976

[54] METHOD FOR MAKING GLASS-CERAMIC ARTICLES EXHIBITING HIGH FRANGIBILITY

[75] Inventors: George H. Beall, Big Flats; William T. Brydges, III.; Joseph Ference, both of Corning; Theodore R. Kozlowski, Horseheads, all of N.Y.

[73] Assignee: The United States of America as represented by the United States Energy Research and Development Administration, Washington, D.C.

[22] Filed: Jan. 28, 1974

[21] Appl. No.: 437,008

[52] U.S. Cl. .................................... 65/30 E; 65/33
[51] Int. Cl. ..................... C03c 15/00; C03b 29/00
[58] Field of Search ............................. 65/33, 30 E

[56] References Cited
UNITED STATES PATENTS

| | | | |
|---|---|---|---|
| 3,485,644 | 12/1969 | Shonebarger | 65/33 X |
| 3,486,963 | 12/1969 | Smith | 65/33 X |
| 3,573,077 | 3/1971 | Beal et al. | 65/33 X |
| 3,585,054 | 6/1971 | Karstetter | 65/33 X |
| 3,637,453 | 1/1972 | Simmons | 65/33 X |

*Primary Examiner*—S. Leon Bashore
*Assistant Examiner*—Frank W. Miga
*Attorney, Agent, or Firm*—Clinton S. Janes, Jr.; Clarence R. Patty, Jr.

[57] ABSTRACT

This invention is concerned with glass-ceramic articles having compositions within a very narrowly-delimited area of the $MgO-Al_2O_3-B_2O_3-SiO_2$ field and having alpha-quartz and sapphirine as the principal crystal phases, resulting from nucleation through a combination of $TiO_2$ and $ZrO_2$. Upon contacting such articles with lithium ions at an elevated temperature, said lithium ions will replace magnesium ions on a two $Li^+$-for-one $Mg^{+2}$ basis within the crystal structures, thereby providing a unitary glass-ceramic article having an integral surface layer wherein the principal crystal phase is a lithium-stuffed beta-quartz solid solution. That transformation of crystal phases results in compressive stresses being set up within the surface layer as the articles are cooled. Through the careful control of composition, crystallization treatment, and the parameters of the replacement reaction in the crystal structures, a tremendous degree of stored elastic energy can be developed within the articles such that they will demonstrate frangibility when fractured but will not exhibit undesirable spontaneous breakage and/or spalling.

9 Claims, No Drawings

METHOD FOR MAKING GLASS-CERAMIC ARTICLES EXHIBITING HIGH FRANGIBILITY

The invention described herein was made in the course of, or under, a contract with the United States Atomic Energy Commission.

U.S. application Ser. No. 375,724, filed July 2, 1973, describes the production of hard, high-modulus glass-ceramic articles consisting essentially, by weight on the oxide basis, of about 10–16% MgO, 0.5–3.5% $B_2O_3$, 20–28% $Al_2O_3$, and 44–58% $SiO_2$, with 3–9% $TiO_2$ and 3–7% $ZrO_2$ as nucleating agents, the total of these latter two ingredients being about 8–13%. Such articles exhibited modulus of rupture values, as formed, of between about 25,000–60,000 psi, a Knoop hardness ($KHN_{100}$) in excess of 800, a coefficient of thermal expansion (25°–300°C.) between about 90–110 × $10^{-7}$/°C., and contained alpha-quartz and sapphirine ($4MgO·5Al_2O_3·SiO_2$) as the predominant crystal phases.

That application also discloses the fact that those glass-ceramic articles can be strengthened to exhibit modulus of rupture values in excess of 150,000 psi through an ion exchange reaction undertaken at elevated temperatures involving the replacement of $Mg^{+2}$ ions in the structure of the crystals within a surface layer of the article with $Li^+$ ions on a two $Li^+$ ions-for-one $Mg^{+2}$ ion basis. This exchange leads to the transformation of the high expansion MgO-containing crystals to crystals of lithium-stuffed beta-quartz solid solution (also referred to as beta-eucryptite solid solution), which have a much lower coefficient of thermal expansion. Therefore, when the article is cooled to room temperature after the ion exchange reaction, compressive stresses are developed in the surface layer resulting from the presence therein of the low expansion crystals. It is this surface compression layer which imparts the dramatic increase in mechanical strength to the articles.

The desirability of improving the strength of glass-ceramic articles is seemingly self-evident. However, there has been a need for articles which are inherently strong but which, upon fracture, will exhibit frangibility, i.e., the articles will fragmentize violently, when broken through the application of essentially no external energy, into virtually innumerable small pieces. This type of breakage has frequently been termed dicing. In many applications, the optimum situation will comprise having the diameter of these pieces measure less than the thickness dimension of the original article. This phenomenon, in one form, has been utilized in command-break systems, i.e., systems for controlling the frangibility of materials by tailoring the sizes of particles resulting from the initiation of a planned break. Hence, those materials have applications in such varied products and components as fast-opening containers, molds, rocket parts, diaphragms, mateiral-dispensing containers, highway sign posts, aircraft canopies, and security systems. A system can be designed so that the controlled break of one component will trigger the break of a series of components. Or, the fracture of a component can be made to break or connect an electrical circuit. With respect to security systems, the very fine particles resulting from the violent fragmentation leave no useful identification.

This phenomenon of violent fragmentation upon breakage is founded upon stress variations built up within the article as a result of the ion exchange reaction. Hence, compressive stresses are developed within a surface layer which are balanced through tensile stresses concurrently set up in the interior portion of the article. A frangible fracture will take place when a tremendous amount of stored elastic energy is developed within the article as a result of these surface compressive stresses and concomitant internal tensile stresses.

The presence of such vast stored elastic energy leads to the situation that the articles can be subject to spontaneous disintegration due to checks in the surface and/or inhomogeneities within the body of the article. Hence, such checks and inhomogeneities provide sites for stress buildup with consequent failure. This failure can be total destruction of the article or, frequently, particularly in articles of thick-walled dimensions, spalling of the surface. Surface checks can, in general, be observed in a quality control inspection and, where advisable, can be removed through treatment of the surface with a leachant such as hydrofluoric acid. However, body inhomogeneities cannot be removed in such a manner and can only be avoided through careful control of glass composition and crystallization treatment.

The instant invention has for its principal objective the production of unitary, hard, high elastic modulus glass-ceramic articles demonstrating average modulus of rupture values in excess of 150,000 psi which are not subject to spontaneous disintegration or spalling but, which, when broken even with the application of essentially no external energy, will fragmentize violently into many small pieces.

That objective can be accomplished with glass-ceramic articles having compositions within a very sharply delimited area of those disclosed in Ser. No. 375,724 above, which are subjected to the two $Li^+$-ions-for-one $Mg^{+2}$ ion exchange reaction described in that application but conducted in a specifically-defined manner.

The initial glass-ceramic articles are produced through the crystallization in situ of glass articles consisting essentially, by weight on the oxide basis, of about 13–15% MgO, 1–3% $B_2O_3$, 23–26% $Al_2O_3$, and 48–51% $SiO_2$, with about 4–8% $TiO_2$ and 3–7% $ZrO_2$ as nucleating agents, the total $TiO_2$+ $ZrO_2$ ranging between about 9–13%. The glass articles are crystallized in situ by being subjected to a heat treatment within the temperature range of about 900°–1050°C. The glass-ceramic articles are highly crystalline, viz., at least 75% by volume crystalline, and the crystals are very fine-grained, i.e., essentially all finer than 1 micron in diameter. Alpha-quartz and sapphirine comprise the predominant crystal phases with minor amounts of spinel ($MgO·Al_2O_3$), rutile ($TiO_2$), zircon ($ZrSiO_4$), and tetragonal zirconia ($ZrO_2$) normally being present also. The crystals are homogeneously dispersed, but randomly oriented, within a residual glassy matrix (less than 25% by volume of the article) which is highly siliceous in composition.

The most desirable physical characteristics will be secured when the glass compositions consist only of the above-recited components within the delineated ranges. However, very minor additions of other metal oxides or fluoride to the starting batches can be tolerated as melting or forming aids, fining agents, or to modify a specific property of the crystallized body. The sum of all such additions will preferably not exceed about 3% by weight. It is most desirable that the original glass be essentially free from the alkali metal oxides $Li_2O$, $Na_2O$, and $K_2O$. The presence of those oxides can lead to the development of crystal phases other than those set out above and/or the formation of a greater residual glass phase. Furthermore, their presence can dilute the effect produced in the subsequent ion exchange reaction.

The growth of crystals within the glass article is a function of both time and temperature. Thus, in the cooler zone of the 900°–1050°C. range, relatively long exposure times may be demanded to attain the desired high degree of crystallinity, perhaps as long as 24 hours or even longer. In contrast, at the hotter extreme of the crystallization range, as little time as 15 minutes may provide the crystallinity sought.

The general steps involved in the production of glass-ceramic articles are three. First, a batch for a glass is compounded and melted. Second, an article is formed directly from the melt utilizing appropriate glass forming procedures or the glass is cast into stock form from which desired shapes can later be made. Third, the glass article is heat treated to cause crystallization in situ.

In carrying out the second step, it is customary to cool the glass shape to ambient temperature to permit visual inspection of glass quality. However, cooling to room temperature is not necessary to secure the desired high degree of crystallization in the subsequent heat treatment step. It is required, nevertheless, that the melt be cooled to a temperature at least within the transformation range thereof before exposing the article to the crystallization heat treatment. Such cooling is demanded to achieve homogeneous nucleation withh consequent fine-grained crystallization. The transformation range has been defined as the temperature at which a liquid is deemed to have been converted into an amorphous solid. In general, the transofrmation range has been considered to lie in the vicinity of the annealing point of a glass.

In undertaking crystallization of the glass article, the preferred practice involves two steps. First, the article is heated to a temperature somewhat above the transformation range of the glass, e.g., a temperature between about 775°–850°C., and held within that range for a period of time adequate to obtain satisfactory nucleation. Second, the nucleated article is heated to a temperature within the crystallization range for a sufficient length of time to assure extensive crystal growth. This preferred practice contemplates a nucleation time of about 1–6 hours and crystallization in about 1–8 hours.

The two-step procedure of nucleation at one temperature followed by the growth of crystals on those nuclei at a higher temperature is desirable since very uniformly-sized, fine-grained crystals are developed thereby. However, satisfactorily crystallized articles can be achieved where a specific nucleation step as such is not employed but the articles are simply heated to a temperature within the crystallization ranges. Caution must be exercised in carrying out this latter one-step crystallization procedure to avoid deformation of the article.

Thus, as has been observed above, the rate of crystal growth is dependent upon temperature. At temperatures near the transformation range, crystal growth is quite slow and the glass article is subject to deformation. Therefore, the rate at which the glass article is heated to temperatures above the transformation range must not be so rapid that there is insufficient time for a growth of crystals adequate to supply support for the article. Hence, the preferred two-step crystallization heat treatment has the added advantage in minimizing article deformation since the substantial dwell period within the nucleation range insures more rapid and uniform subsequent crystallization.

As has been observed above, frangibility coupled with freedom from spontaneous breakage is directly related to the development of crystalline glass-ceramic articles devoid of surface defects and inhomogeneities or flaws within the body thereof. The occurrence of these latter inhomogeneities is primarily a function of both composition and crystallization heat treatment. Hence, the desired article will be uniformly fine-grained with no crystal phases present other than the alpha-quartz, sapphirine, spinel, rutile, zircon, and tetragonal zirconia noted above. For example, the development of large-sized crystals or of crystals exhibiting a low coefficient of thermal expansion instead of that inherent in the alpha-quartz-sapphirine crystal assemblage can provide the undesired inhomogeneity or flaw.

One type of internal inhomogeneity which has frequently been observed on fractured surfaces of the crystallized articles consists of inclusions of foreign matter which have been termed nodules. These nodular inclusions are typically about 10 microns in diameter. Absolute identification of the particles has not been secured but circumstantial evidence suggests the crystal cordierite which, by reason of its low coefficient of thermal expansion in comparison with alpha-quartz and sapphirine, introduces stress concentrations into the glass-ceramic body.

The nodules are believed to be sources or catalysts for spontaneous breakage of the crystallized articles during or subsequent to the ion exchange strengthening step. Thus, experience has demonstrated that the probability of the glass-ceramic articles surviving the cooling from the temperature of the ion exchange step to room temperature is an inverse function of the nodule content.

The formation of these inclusions is sensitive to base glass composition and to the crystallization treatment. Hence, compositions outside of the above prescribed ranges are more prone to the development of nodules. Furthermore, the growth of these inhomogeneities can apparently be inhibited by utilizing a relatively short period in the crystallization range (900°–1050°C.). Such a practice will seemingly produce a satisfactorily highly crystallized article (although obviously not as crystalline as will be obtained after longer exposure times) but does not provide time for the growth of nodules.

Hence, for example, when a glass article of this invention was heated at the rate of about 5°C./minute from room temperature to about 1050°C. and then immediately allowed to cool to room temperature within the heating chamber, the article was exposed to the crystallization range for about 2 hours. Some deformation of the article was observed and the crystals present were not as fine-grained as desired for optimum properties, but the body was reasonably highly crystalline and essentially free of nodules. In another instance, when a glass article of like composition was first nucleated for 4 hours at 825°C., then heated at 5°C./minute to 1050°C., and thereafter immediately cooled to room temperature within the heating chamber, the article was again subjected to the crystallization range for about two hours. No deformation of the article was observed; the article was highly crystalline; the crystals were relatively uniformly fine-grained; and nodules were essentially absent. In still another instance, when a glass article of similar composition was first nucleated at 825°C. for four hours, then heated at 5°C./minute to 1050°C., held at that temperature for four hours, and thereafter cooled to room temperature within the heating chamber, the article remained within the crystallization range for about six hours. No deformation of the article was observed; the article was substantially completely crystallized; the crystals were very uniformly fine-grained; but several nodules were found when cross sections of the article were examined. In view of those findings, the most preferred crystallization practice contemplates maintaining the nucleated glass within the crystallization temperature range for no more than about two hours.

The inclusion of $SiO_2$ in the base glass composition in amounts greater than about 51% and/or the presence of MgO in excess of about 15% commonly results in the growth of cordierite crystals ($2MgO \cdot 2Al_2O_3 \cdot 5SiO_2$) which display a low coefficient of thermal expansion. $SiO_2$ must be utilized in an amount not less than about 48% to insure good glass stability, i.e., devitrification of the melt is avoided during cooling to a glass. Such devitrification produces large crystals. The addition of $B_2O_3$ is vital to inhibit devitrification of the melt during cooling and forming and to forestall cracking of the body in the crystallization step. Nevertheless, more than about 3% exercises an adverse effect upon the strength developed during the ion exchange reaction. $Al_2O_3$ will be held below about 26% to avoid liquidus problems and general glass instability. Also, spalling of the glass-ceramic surface is a frequent problem at high $Al_2O_3$ levels. $TiO_2$ is a very efficient nucleating agent for the glasses of this invention but, unfortunately, has the tendency to cause the growth of the low expansion cordierite crystals. $ZrO_2$ is a less efficient nucleating agent than $TiO_2$ but has the favorable property of not causing the growth of cordierite. Therefore, the desired highly crystalline articles, wherein the crystals are uniformly very fine-grained, are attained through nucleation via a combination of $TiO_2$ and $ZrO_2$. An adequate amount of $ZrO_2$ is included to stabilize the formation of the assemblage of alpha-quartz and sapphirine against the development of cordierite.

As was observed above, the preferred crystallization heat treatment contemplates two steps. The exposure of the glass article for a period of time to a temperature at which nucleation takes place assures the subsequent growth of more uniformly fine crystallization, since this step provides for the development of nuclei throughout the glass body which will act as sites for homogeneous crystal growth. Crystallization temperatures in excess of 1050°C. hazard grain growth of the crystals and lead to the development of undesirable low expansion phases such as cordierite even in the presence of $ZrO_2$. Crystallization temperatures below about 900°C. result in such slow crystal growth that the desired assemblage of crystal phases and, consequently, the desired physical properties are not developed within a practical length of time.

Table I reports compositions of glasses, expressed in weight percent on the oxide basis, which, when exposed to the defined crystallization practice of this invention, can be crystallized in situ to glass-ceramic articles containing uniformly-sized, very fine-grained crystals of alpha-quartz and sapphirine with, commonly, spinel, rutile, zircon, and/or tetragonal zirconia randomly oriented, but homogeneously dispersed, within a glassy matrix. The actual ingredients of the initial glass batches can be any materials, either oxides or other compounds, which, upon being melted together, are converted into the desired oxide compositions in the proper proportions.

The batch ingredients were compounded, ballmilled together to assist in securing a homogeneous melt, and melted in a small continuous tank or in platinum crucibles at temperatures ranging between about 1550°–1650°C. Bars (10 × 3½ × 1 inch) and discs (6 diameter × 1 inch) were formed and immediately annealed at a temperature of about 750°C. $As_2O_5$ was included as a fining agent and is reported as $As_2O_3$ in the analyses listed in Table I. Other fining agents such as chloride, nitrate, and $Sb_2O_5$ can also perform that function.

TABLE I

| | 1 | 2 | 3 | 4 | 5 | 6 | 7 | 8 |
|---|---|---|---|---|---|---|---|---|
| $SiO_2$ | 50.1% | 49.3% | 48.6% | 49.2% | 49.3% | 48.4% | 48.3% | 48.4% |
| $Al_2O_3$ | 23.6 | 24.5 | 25.4 | 24.6 | 24.3 | 24.6 | 27.2 | 26.2 |
| MgO | 14.0 | 13.9 | 13.9 | 14.0 | 14.0 | 12.0 | 11.8 | 12.4 |
| $B_2O_3$ | 1.5 | 1.5 | 1.4 | 1.4 | 1.5 | 1.4 | 1.4 | 1.4 |
| $TiO_2$ | 6.9 | 7.0 | 6.8 | 6.9 | 6.9 | 8.4 | 6.9 | 6.9 |
| $ZrO_2$ | 3.6 | 3.5 | 3.6 | 3.4 | 3.4 | 3.4 | 3.4 | 3.5 |
| $As_2O_3$ | 0.3 | 0.3 | 0.3 | 0.5 | 0.6 | 0.6 | 0.7 | 0.4 |

After annealing to room temperature, the bars and discs were visually examined for glass quality. Test specimens were sawed, fine-ground, and edge-finished to eliminate a pristine surface that could effect subsequent measurements. To insure absence of surface checks, each sample was immersed in a HF-containing solution for a time to remove about 0.001 inch of the body surface. After washing in tap water, each specimen was placed in an electrically-fired furnace and heated at a rate of about 5°C./minute to the dwell temperature set out in Table II. Upon completion of the crystallization schedule, the electric current to the furnace was cut off and the articles cooled to room temperature within the furnace. That practice has been termed "cooling at furnace rate" and the rate of such cooling has been estimated to average about 3°–5°C./minute. More rapid rates of cooling can be utilized, especially in those instances of thin-walled articles, but the above practice has been customarily employed simply out of convenience.

Table II also records a visual description of the product and the crystal phase identified therein through X-ray diffraction analysis. Elastic modulus (× $10^6$ psi), Knoop hardness ($KHN_{100}$), modulus of rupture (psi) and coefficient of thermal expansion over the range 25°–300°C. (× $10^{-7}$/°C.) are tabulated where measured on individual samples utilizing conventional techniques.

TABLE II

| Example No. | Heat Treatment | Visual Description | Crystal Phases | Elastic Modulus | Knoop Hardness | Coeff. Of Expansion | Modulus of Rupture |
|---|---|---|---|---|---|---|---|
| 1 | 820°C. for 4 hours<br>950°C. for 4 hours | White, opaque, very fine-grained | alpha-quartz, sapphirine, zircon, tetragonal $ZrO_2$, rutile | 20.6 | 951 | 105 | 45,000 |
| 1 | 820°C. for 4 hours<br>975°C. for 4 hours | White, opaque, very fine-grained | alpha-quartz, sapphirine, zircon, rutile | 21.7 | 996 | 104 | 35,000 |
| 1 | 820°C. for 4 hours<br>1050°C. no hold | White, opaque, very fine-grained | alpha-quartz, sapphirine, zircon, rutile | 20.6 | 856 | 104 | |
| 2 | 820°C. for 4 hours<br>925°C. for 4 hours | Gray, translucent, very fine-grained | alpha-quartz, sapphirine, zircon, tetragonal $ZrO_2$, rutile | 19.2 | 831 | 92 | 38,000 |
| 2 | 820°C. for 4 hours<br>950°C. for 4 hours | White, opaque, very fine-grained | alpha-quartz, sapphirine, zircon, tetragonal $ZrO_2$, rutile | 20.7 | 976 | 105 | |
| 2 | 820°C. for 4 hours<br>975°C. for 4 hours | White, opaque, very fine-grained | alpha-quartz, sapphirine, zircon, tetragonal $ZrO_2$, rutile | 21.7 | 1090 | 103 | |
| 2 | 825°C. for 4 hours<br>1025°C. no hold | White, opaque, very fine-grained | alpha-quartz, sapphirine, zircon, tetragonal $ZrO_2$, rutile | 21.1 | 833 | 103 | |
| 3 | 820°C. for 4 hours<br>950°C. for 4 hours | White, opaque, very fine-grained | alpha-quartz, sapphirine, rutile, tetragonal $ZrO_2$ | 20.0 | 980 | 102 | 42,000 |
| 3 | 820°C. for 4 hours<br>1050°C. no hold | White, opaque, very fine-grained | alpha-quartz, sapphirine, zircon, tetragonal $ZrO_2$, rutile | 21.2 | 831 | 105 | |
| 4 | 820°C. for 4 hours<br>965°C. for 4 hours | White, opaque, very fine-grained | alpha-quartz, sapphirine, spinel, $ZrO_2$, rutile | | | | |
| 5 | 820°C. for 4 hours<br>965°C. for 4 hours | White, opaque, very fine-grained | alpha-quartz, sapphirine, spinel, zircon, $ZrO_2$, rutile | 21.2 | 1031 | 103 | 36,000 |
| 6 | 825°C. for 4 hours<br>950°C. for 4 hours | Gray, opaque, very fine-grained | alpha-quartz, sapphirine, spinel, $ZrO_2$, rutile | | | 51.1 | weak |
| 7 | 825°C. for 4 hours<br>950°C. for 4 hours | White, opaque, very fine-grained | alpha-quartz, sapphirine, spinel, $ZrO_2$, rutile | | | 107.4 | 48,200 |
| 8 | 820°C. for 4 hours<br>970°C. for 4 hours | White, opaque, very fine-grained | alpha-quartz, sapphirine, spinel, $ZrO_2$, rutile | 21.5 | | 105.4 | |

Table II is illustrative of the high elastic modulus, Knoop hardness, and mechanical strength exhibited by the articles. Thus, elastic moduli up to $22 \times 10^6$ psi are attainable, Knoop hardness values well in excess of 800 are invariably achieved, and modulus of rupture measurements are secured ranging between about 25,000–50,000 psi.

The strength demonstrated by the articles is considered to be the result of compressive stresses being set up in the surface thereof because of phase transformation occurring within the surface and interior portions of the articles. In essence, there is believed to be a self-strengthening mechanism involved founded upon the phenomenon of a greater volume shrinkage taking place in the interior portion than in the surface layer. This greater contraction of the interior portion gives rise to compressive stresses being developed within the surface layer. Commonly, the overall shrinkage undergone by the articles during the crystallization heat treatment will range between about 3–5%.

The exceptional hardness illustrated on the surface of these articles is postulated to be caused by the growth of very hard and dense crystal phases (alpha-quartz and sapphirine) which are also responsible for the substantial shrinkage taking place during the crystallization step. The Knoop hardness determinations ($KHN_{100}$) greater than 800 and, frequently, in excess of 1000, are much improved over those normally exhibited by glass-ceramic articles. For example, Corning Code 9606 and Corning Code 9608, two commercially-marketed glass-ceramic products, have Knoop hardness measurements ($KHN_{100}$) of 698 and 703, respectively.

U.S. application Ser. No. 375,724 supra, discusses the fundamental mechanics involved in an ion exchange reaction taking place in glass-ceramic articles containing alpha-quartz and sapphirine as the predominant crystal phases wherein two lithium ions from an external source replace one magnesium ion in the crystal structure. Thus, this exchange causes the transformation of the MgO-containing crystals to crystals of lithium-stuffed beta-quartz solid solution, also termed beta-eucryptite solid solution.

As is explained in that application, beta-eucryptite is a crystal in the trapezohedral class of the hexagonal system with the classical formula $Li_2O \cdot Al_2O_3 \cdot 2SiO_2$. However, in glass-ceramic articles it has been found that the crystal composition does not conform strictly to the nominal formula of the naturally-occurring crystal but, rather, is more akin in nature to a solid solution represented generally by the formula $Li_2O \cdot Al_2O_3 \cdot nSiO_2$, where $n$ can range between 2–7 and even higher depending upon the $SiO_2$ content of the parent glass. Nevertheless, the characteristic geometric pattern of the crystal, as defined through X-ray diffraction analysis, delineates the trapezohedral class of the hexagonal system.

Where the oxide stoichiometry in the crystal is such that $n$ ranges between about 2–3.5, a stable beta-eucryptite solid solution crystal will commonly be secured. However, where $n$ rises to above about 3.5, stability is generally lost and the beta-eucryptite converts to beta-spodumene solid solution as the stable phase.

The potential for tremendous improvement in mechanical strength and a concurrent frangible-type breakage characteristic exhibited by the articles of the instant invention is founded in the presence of alpha-quartz, sapphirine, and, frequently, spinel as crystal phases therein. Thus, sapphirine and spinel possess high coefficients of thermal expansion and provide a source of $Mg^{+2}$ ions. Also, the MgO and $Al_2O_3$ contents of those crystals are nearly equimolar, thereby providing a modifier-to-alumina ratio aproximating 1:1 which is required for producing beta-eucryptite solid solution within the surface of the glass-ceramic article as a result of the exchange reaction. Beta-eucryptite solid solution crystals (Li-stuffed beta-quartz solid solution) demonstrate very low coefficients of thermal expansion. This conversion of sapphirine and spinel to Li-stuffed beta-quartz solid solution in the ion exchange surface has been shown through X-ray diffraction analyses.

The silica component of the glass-ceramic articles is desirably present in the form of trigonal alpha-quartz, which polymorph of silica exhibits a high coefficient of thermal expansion. This crystal phase will be converted to the hexagonal beta-quartz form at the temperatures utilized in the ion exchange reaction (generally about 850°–1000°C.). The beta-quartz polymorph has a low coefficient of thermal expansion.

Beta-quartz and beta-eucryptite are isostructural in nature leading to a gradational merging therebetween with strong bonding developing during the ion exchange reaction. Hence, since the body portion of the glass-ceramic article contains quartz as a major crystal phase accompanied with sapphirine and, frequently, spinel and the exchanged surface layer consists of Li-stuffed beta-quartz solid solution (beta-eucryptite solid solution), mutual solid solution can occur. To promote the development of beta-eucryptite in the surface layer and simultaneously inhibit the growth of beta-spodumene during the ion exchange reaction, inasmuch as beta-spodumene forms sharp and, generally, weak interfaces with the quartz-rich body portion of the article, the composition of the glass-ceramic will be held below the $Si_2O_4$:$MgAl_2O_4$ mole ratio necessary to form beta-eucryptite, viz., about 3:2. Mole ratios of $Si_2O_4$:$MgAl_2O_4$ less than about 1:1 are undesirable for reasons of glass stability.

Table III records various ion exchange treatments carried out on the several examples of Table II, the particular crystallization schedules utilized to produce the glass-ceramic article also being tabulated. In each instance, measurements of mechanical strength were determined on bar samples (3 × ½ × ⅛ inch) and a visual qualitative measure of the fragmentation or dicing character was obtained on 2 × 2 × ⅛ inch squares. As is customary in the glass-ceramic strengthening art, a bath of a molten lithium salt comprised the source of lithium ions, although it will be appreciated that other environments such as pastes and gases can also be employed. Normally, the samples were briefly exposed to a temperature in the proximity of the salt bath operating temperature to lessen the chance for thermal breakage. High strength plus frangibility are functions both of the time and temperature of immersion utilized in the ion replacement reaction. Furthermore, inasmuch as the property of frangibility is dependent upon the presence of extremely high stored energy density which, in turn, is related to the depth of the surface compression layer and the magnitude of the stress therein, the immersion time required to achieve good frangibility will usually be considerably longer than that adequate to yield high strength. Hence, the characteristic of frangibility mandates relatively deep surface compression layers, i.e., a depth of at least about one percent of the cross section of an article, with a consequent great buildup of internal tension. For example, in an article having a wall thickness of ⅛ inch, a minimum depth of about 35 microns will normally be required. At least about 4 hours will commonly be necessary to develop frangible character in an article of ⅛ inch cross section with longer immersion times, such as 16 hours, normally being employed to attain deeper surface layers. With articles of thicker cross section, still longer immersion times may, obviously, be demanded.

Molten $Li_2SO_4$ comprises the source of lithium ions in the ion exchange reactions set out in Table III. It must be recognized that other lithium compounds can be operable which are fluid at the exchange temperatures employed. Mixtures of sodium salts such as $Na_2SO_4$ and $NaHSO_4$ and potassium salts such as $K_2SO_4$ and $KHSO_4$ with $Li_2SO_4$ can be useful in securing a range of bath temperatures and control of spalling. The $Na^+$ and $K^+$ ions are much larger in size, thereby exhibiting relatively slow mobility when compared with $Li^+$ ions and, therefore, do not adversely affect the $Li^+$-for-one $Mg^{+2}$ ion exchange.

A qualitative measure of the dicing quality of the ion exchanged 2 × 2 × ⅛ inch squares was achieved by visually observing the fracture resulting through the application of minimum pressure to a firthite point contacting the center of the square necessary to penetrate the surface compression layer. Inasmuch as the area of contact between the firthite point and the sample is so small, when compared to the total area of the square, the external energy applied to the square through the point contact was deemed to be essentially negligible. Therefore, the resulting breakage was considered to be due solely to the stored elastic energy within the square developed as a result of the ion exchange reaction. It can be appreciated that other devices, such as sandblasting, can be employed to cause fracture with the application of essentially no external energy. And, under actual service conditions as, for example, aircraft canopies and highway sign posts, the means of fracture will depend upon the use of the product. Nevertheless, breaking the articles through the application of essentially no external energy is a useful test of the frangible character of an article.

It will be appreciated, of course, that the articles will demonstrate dicing when fractured under the impact of considerable external energy, but the use of such force in a testing procedure would mask the violent fragmentation arising solely through the stored elastic energy within the body. Hence, the above test utilizing a very highly localized impact of overall low force is believed to reasonably indicate the behavior an article will display when fractured through the application of essentially no external energy.

A high dicing character denotes that substantially all of the pieces resulting from the break were no larger than ⅛ inch in diameter, i.e., the thickness of the original sample. Low dicing signifies that most of the broken pieces were greater than ⅛ inch in diameter.

TABLE III

| Example No. | Crystallization Treatment | Salt Bath and Treatment | Modulus of Rupture | Frangibility |
|---|---|---|---|---|
| 1 | 820°C. for 4 hours 950°C. for 4 hours | 100% $Li_2SO_4$ 910°C. for 48 hours | 163,000 psi | high |
| 1 | 820°C. for 4 hours 975°C. for 4 hours | 100% $Li_2SO_4$ 910°C. for 48 hours | 187,000 psi | high |

TABLE III-continued

| Example No. | Crystallization Treatment | Salt Bath and Treatment | Modulus of Rupture | Frangibility |
|---|---|---|---|---|
| 1 | 820°C. for 4 hours<br>1050°C. for no hold | 100% $Li_2SO_4$<br>910°C. for 48 hours | 153,000 psi | high |
| 2 | 820°C. for 4 hours<br>925°C. for 4 hours | 100% $Li_2SO_4$<br>910°C. for 48 hours | 153,000 psi | high |
| 2 | 820°C. for 4 hours<br>950°C. for 4 hours | 100% $Li_2SO_4$<br>910°C. for 48 hours | 168,000 psi | high |
| 2 | 820°C. for 4 hours<br>975°C. for 4 hours | 100% $Li_2SO_4$<br>910°C. for 48 hours | 176,000 psi | high |
| 2 | 825°C. for 4 hours<br>1050°C. for no hold | 100% $Li_2SO_4$<br>910°C. for 48 hours | 159,000 psi | high |
| 3 | 820°C. for 4 hours<br>950°C. for 4 hours | 100% $Li_2SO_4$<br>910°C. for 48 hours | 162,000 psi | high |
| 3 | 820°C. for 4 hours<br>975°C. for 4 hours | 100% $Li_2SO_4$<br>910°C. for 48 hours | 150,000 psi | high |
| 3 | 820°C. for 4 hours<br>1050°C. for no hold | 100% $Li_2SO_4$<br>910°C. for 48 hours | 151,000 psi | high |
| 4 | 815°C. for 4 hours<br>965°C. for 4 hours | 100% $Li_2SO_4$<br>910°C. for 4 hours | 160,000 psi | high |
| 5 | 800°C. for 2 hours<br>940°C. for 2 hours | 100% $Li_2SO_4$<br>910°C. for 48 hours | 176,000 psi | high |
| 6 | 820°C. for 4 hours<br>950°C. for 4 hours | 100% $Li_2SO_4$<br>920°C. for 16 hours | 70,000 psi | low |
| 7 | 820°C. for 4 hours<br>980°C. for 4 hours | 100% $Li_2SO_4$<br>880°C. for 16 hours | 125,000 psi | samples spalled after exchange |
| 8 | 820°C. for 4 hours<br>970°C. for 4 hours | 100% $Li_2SO_4$<br>900°C. for 18 hours | 162,000 psi | samples spalled after exchange |

It will be appreciated, of course, that in the case of very thick-walled articles, dicing may not be complete but the breakage will still be explosive. However, as is apparent from Examples 6–8 of Table III, the composition and process parameters promulgated previously must be rigidly observed to insure high strength with accompanying frangibility and to avoid such other disadvantages properties as spalling and/or spontaneous breakage after the ion exchange process.

As defined herein, spalling involves the separation of the surface-exchanged layer from the body portion of the article, normally commencing at corners and edges and the working across a face of the article. Generally, the extent of spalling will be greater where longer times of ion exchange are employed. The occurrence of spalling is believed to sharply reduce the frangibility potential of an article by decreasing the built-in stresses. Furthermore, spalling of the surface layer can increase the hazard of spontaneous breakage.

Microscopic examination of the surface of the glass-ceramic articles immersed into a bath of molten $Li_2SO_4$ has frequently manifested surface porosity, apparently resulting from attack by the salt. And, occasionally, minor spalling of the exchanged layer, especially at a sharp edge of a sample, would be observed after the immersion. These phenomena were more likely present after very extended immersion times, e.g., 72–168 hours. The surface porosity was normally undesirable, if only from an aesthetic point of view, since cleaning of an article is rendered more difficult. The spalling was a more serious problem since, as was noted above, it releases stored energy, thereby reducing sample frangibility, and also heightens the possibility of spontaneous breakage.

The addition of up to 25% by weight of the sulphate and/or bisulphate of sodium and/or potassium has been found to inhibit the occurrence of these phenomenon. The bisulphate additions have been particularly useful for two reasons, the preferred mixtures being 91% $Li_2SO_4$–9% $NaHSO_4$ and 91% $Li_2SO_4$–9% $KHSO_4$. First, the addition of bisulphate increases the acidity of the bath which has the salutary effect of reducing the surface attack leading to porosity. Second, the presence of the larger cation, i.e., $Na^+$ and/or $K^+$, is believed to alter the ion exchanged stress and compositional interface with a concomitant reduction in tendency to spall. Hence, it is thought that the larger cation penetrates into the glass-ceramic article resulting in a more gradual stress profile.

In sum, the inclusion of sodium and/or potassium salts with lithium salts not only provides means for obtaining a range of salt bath temperatures, but also can function, particularly in instances of long time immersions, to relieve surface porosity and spalling tendencies.

As illustrative of those results, when Example No. 5 reported in Table III was maintained immersed within the 100% $Li_2SO_4$ bath at 910°C. for 168 hours, some surface porosity and edge spalling were observed. However, samples immersed for 168 hours in a bath of molten 91% $Li_2SO_4$–9% $NaHSO_4$ operating at 910°C. showed clean surfaces and no edge spalling.

As has been observed above, the depth of ion exchange necessary to secure a high degree of frangibility upon fracture is dependent upon the thickness dimension of the article being treated, an article of greater thickness necessitating greater depths of ion exchange. Frangibility is believed to be a function of the stored energy density within the article as well as the magnitude of the tensile stresses contained within the inner or body portion of the article. The stored energy has been determined to be approximately directly proportional to the depth of the exchanged layer and the square of the compressive stress at the surface, while being inversely proportional to the elastic modulus. The depth of the exchange and the consequent stored energy is approximately proportional to the square root of the exchange time at constant temperature. Hence, through a series of treatments wherein the time and temperature of the ion exchange process are varied, the optimum ion exchange treatment can be readily derived which will produce the desired fragmentation pattern for a particular article geometry.

There is an adverse relationship existing between the mechanical strength derived through the ion exchange reaction and the degree of frangibility demonstrated by an article. Thus, frangibility demands a relatively deep surface reaction layer such that the stored energy density within the body of the article will be very high. However, the mechanical strength exhibited by an article, as measured in terms of modulus of rupture, will be greater where the surface exchanged layer is relatively thin. Nevertheless, here again, the optimum ion exchange schedule can be readily determined empirically which will yield the desired combination of high mechanical strength and frangibility.

We claim:

1. A method for making a unitary glass-ceramic article exhibiting a modulus of rupture in excess of about 150,000 psi which will, upon fracture through the application of essentially no external energy, fragmentize violently, and wherein the crystal assemblage thereof constitutes at least 75% by volume of the article, said article having an integral surface compressive stress layer and an interior tensile stress portion which comprises:

a. melting a batch for a glass consisting essentially, by weight on the oxide basis, of about 13–15% MgO, 1–3% $B_2O_3$, 23–26% $Al_2O_3$, 48–51% $SiO_2$, 4–8% $TiO_2$, and 3–7% $ZrO_2$, wherein the total $TiO_2$+ $ZrO_2$ ranges between about 9–13%;

b. simultaneously cooling the melt to at least within the transformation range thereof and shaping a glass body therefrom;

c. heating said glass body to a temperature between about 900°–1050°C. for a period of time sufficient to crystallize said glass body to a glass-ceramic article wherein the crystal assemblage constitutes at least 75% by volume of the article and consists predominantly of alpha-quartz and sapphirine;

d. contacting said glass-ceramic article with a source of lithium ions at a temperature between about 850°–1000°C. for a period of time sufficient to replace at least part of the magnesium ions of said $Mg^{+2}$ ion-containing crystals in a surface layer within the article to a depth of at least 1% of the cross section thereof with lithium ions on a two lithium ions-for-one magnesium ion basis to produce crystals of lithium-stuffed beta-quartz solid solution crystals in said surface layer; and then e. cooling said article to room temperature to thereby produce an article having an integral compressively stressed surface layer and an interior tensilely stressed portion.

2. A method according to claim 1 wherein said glass body is heated to 775°–850°C. for about 1–8 hours to cause substantial nucleation thereof prior to crystallizing said glass body at about 900°–1050°C.

3. A method according to claim 2 wherein said time sufficient to crystallize the glass body ranges between about 1–6 hours.

4. A method according to claim 3 wherein said time is no more than about 2 hours.

5. A method according to claim 1 wherein said period of time sufficient to replace at least part of the magnesium ions with lithium ions is at least 4 hours.

6. A method according to claim 1 wherein said source of lithium ions is a bath of a molten lithium salt.

7. A method according to claim 6 wherein said lithium salt is $Li_2SO_4$.

8. A method according to claim 6 wherein said source of lithium ions is a bath of molten lithium salt containing up to 25% by weight of a molten sodium and/or potassium salt.

9. A method according to claim 8 wherein said source of lithium ions is a bath of molten $Li_2SO_4$ with 9% by weight of $NaHSO_4$ and/or $KHSO_4$.

* * * * *